Dec. 7, 1965   M. HOFFMAN   3,221,596
VACUUM FILM HOLDER

Filed Oct. 1, 1963   3 Sheets-Sheet 1

INVENTOR.
MORRIS HOFFMAN
BY
Leonard H. King
ATTORNEY

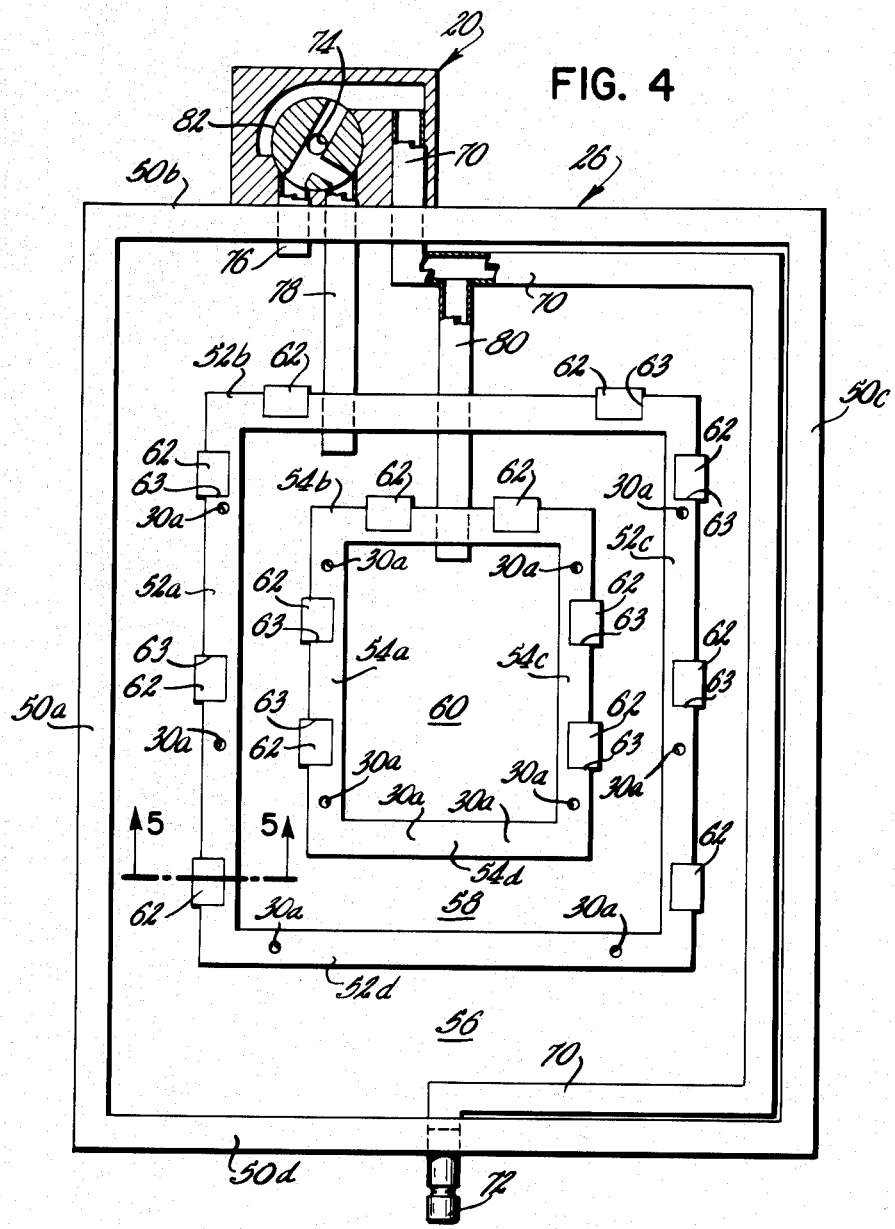

Dec. 7, 1965  M. HOFFMAN  3,221,596
VACUUM FILM HOLDER

Filed Oct. 1, 1963  3 Sheets-Sheet 3

INVENTOR.
MORRIS HOFFMAN
BY
Leonard H. King
ATTORNEY

United States Patent Office 3,221,596
Patented Dec. 7, 1965

3,221,596
VACUUM FILM HOLDER
Morris Hoffman, 240 Jerusalem Ave., Hicksville, N.Y.
Filed Oct. 1, 1963, Ser. No. 312,904
18 Claims. (Cl. 88—24)

This invention relates generally to vacuum holders for thin sheet films of flexible photosensitive material and more particularly to improved guiding and holding means for various sizes of film sheet. The present invention also relates to vacuum film holders provided with alternatively usable inlets for the application of a vacuum.

In certain photographic work, such as with color film in particular, the stringent requirements of precision necessitate that the support for the photosensitive material be of the vacuum type. This method permits the thin, flexible photosensitive material to be firmly held, as by suction, against a flat plane. It is conventional practice in the art to employ such a vacuum back as an integral part of a camera and most commonly, it is in the form of a hinged back. In practice, because of the limitation of prior art film holders, the back of the camera was frequently enclosed in a darkroom so that the photosensitive medium may be loaded therein and have vacuum applied thereto to hold it in place. The front part, or lens portion, of the camera was usually in another room where the objects to be photographed were arranged under suitable light conditions. In the alternative, if no darkroom was provided, it was required that the entire room be blacked out in order to load the camera. It will be appreciated that if more than one camera was in operation, this last mentioned alternative was undesirable in that no cameras could be used under conditions of light while one camera was being loaded. Further, when the front and back of the camera were each located in separate rooms, much of the camera's mobility was lost. This arrangement had the additional drawback of making the number and location of cameras dependent on the size and location of the common darkroom.

The present invention is designed for use in cameras employed in the graphic arts and in industrial applications which use a relatively thin, flexible photosensitive film. A paper medium or thin metal sheet will similarly be held in a perfectly flat focal plane of the camera lens. The film holder of the present invention is portable, thus permitting a quantity of holders to be loaded in a darkroom remote from the cameras. Since the holders in common use today accommodate a range of sheet sizes, the present invention provides mechanical holding means that may be utilized with a variety of sheet sizes and which permits a rapid change from one sheet size to another without the use of special tools. The present invention firmly holds the thin flexible sheet in accurate register within the holder prior to application of vacuum at the camera site.

The particular means to hold the sheets is a pair of flat film guides which are magnetically attracted to a flat film supporting surface of the apparatus. The film guides contain pins which accurately register with apertures in the holder so that, when in use, the clamps define an area beneath which is a suction chamber substantially the same size as the film being used. The attractive force of the magnets is sufficiently strong to retain the film guides and the film being held prior to the application of suction, but weak enough to permit easy removal of the film guides when it is desired to reposition them for a different size sheet. The inclusion of the magnets and the guide holding means does not increase the overall thickness of the holder, thus permitting the improved holder to be used with existing cameras.

Another feature of the present invention is the inclusion of dual inlet ports in a vacuum film holder. Thus the holder may be inserted into the camera and utilize a vacuum source integral with the camera or alternatively, one inlet port may be plugged and when the holder is inserted in the camera an external source of vacuum used with the second inlet port. In either case, a valve common to both inlet ports permits the switching from one film size to another within the range of the holder.

As is in the prior art, the film holder is provided with a slide to shield the film from sources of light. When the film guides are adjusted to the size film being used, the holder is loaded in a darkroom. The loaded holder may then be taken from the darkroom and inserted into the spring back of a conventional camera and have vacuum applied to insure that the film is perfectly flat. The light shield slide is then removed, and assuming that the camera is so adjusted as to be in proper focus, the exposure is made.

It is therefore an object to provide a vacuum film holder with magnetically held film guides.

Another object is to provide a vacuum film holder having a film guiding and holding means readily adaptable to retain a range of sheet sizes.

Still another object is to provide in a vacuum film holder magnetically held film guides for a range of sheet sizes that will securely hold the sheet prior to the application of suction.

A further object is to provide simple holding means in a vacuum film holder that will accurately position and retain a thin, flexible sheet of film prior to the application of suction.

Another feature of the invention is that the present invention permits the use of standard film holder camera backs, such as a vacuum back camera.

An additional object is to provide dual inlet ports in a vacuum film holder so that a vacuum source either integral with or external to the camera may be used.

A further object is to provide a film holder which, due to its simplicity, may be quickly attached to any camera.

Another object is to provide a film holder having simple film guide means for a variety of sheet sizes which may be used without additional tools and which is not thicker than conventional film holders.

These and other objects of the present invention will, in part, be pointed out with particularity and will, in part, be apparent from the following description taken in conjunction with the appended drawing.

In the various figures of the drawing, like reference characters designate like parts.

In the drawing:

FIG. 4 is a symbolic plan view on an enlarged scale of the embodiment of FIG. 1 with the front, apertured film support plate removed.

Figure 1:
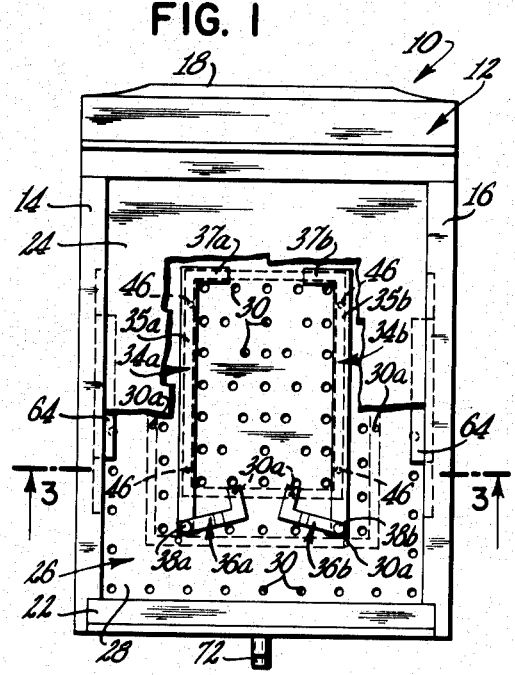
FIG. 1 is a front plan view of an improved vacuum film holder employing the present invention with a portion of the protective light shield partially broken away to illustrate the adjustable film guides.

Referring now to the drawing, particularly FIG. 1 and

Figure 2:
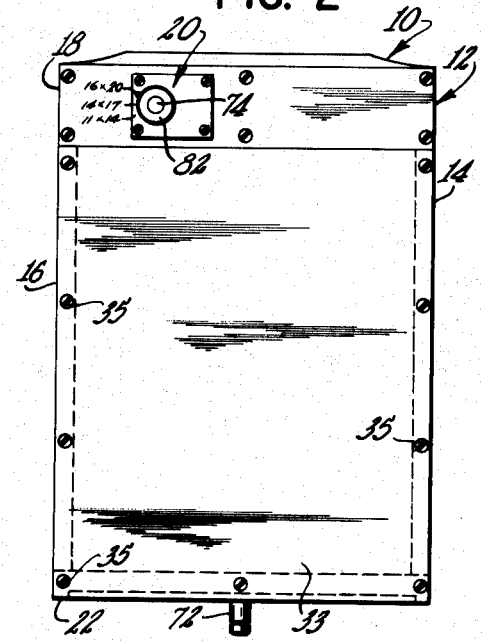
FIG. 2 is a rear plan view of the FIG. 1 film holder.

FIG. 2, film holder 10 is comprised of frame member 12 having side rails 14 and 16. Top cross piece 18, which is secured to the side rails, contains valve assembly 20. Bottom cross piece 22 is hinged at its outer face to admit the photosensitive medium and light shield 24. Manifold assembly 26 in the form of hollow, compartmental nested chambers is retained within frame member 12 on peripheral seat 13 and is comprised of a substantially flat, film supporting front plate 28 having apertures 30 arranged in particular patterns to be described hereinafter and a spaced rear plate 32. Cover plate 33, affixed to frame 12 by screws 35 firmly holds manifold assembly 26 in place.

Figure 6:
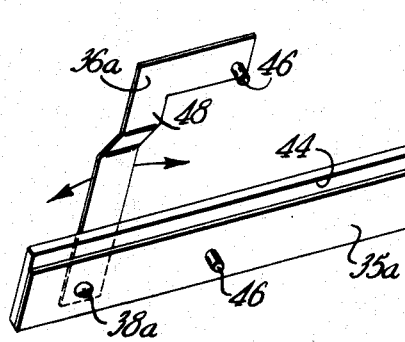
FIG. 6 is a pictorial view of the film guide means.
Figure 5:
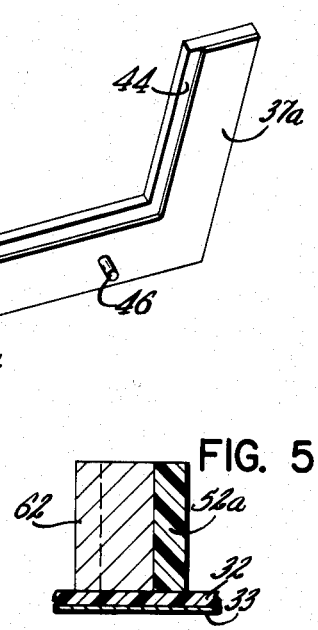
FIG. 5 is a sectional view taken along line 5—5 of FIG. 4.

As may be seen in FIG. 1 and FIG. 6, film guide means 34a and 34b are essentially flat, L-shaped members, each having a long leg 35a and 35b and a short leg 37a and 37b, and are further provided with extensions 36a and 36b pivotally mounted proximate one end of legs 35a and 35b at 38a and 38b. The film guide means in the embodiment illustrated are made up of a top layer 40 secured to a ferromagnetic layer 42 of somewhat narrower width. This dimensional difference of widths defines a lip portion 44 which will overlay and hold a sheet of thin, flexible, photosensitive material. Pins 46 depend from the underside of film guide means 34a and 34b and are adapted to register with apertures 30a formed in the film supporting front plate 28. Extensions 36a and 36b are also formed of a ferromagnetic material and are provided with an offset portion 48 so that the pin contained therein will be in the same plane as the pins in the leg portions 35a and 35b of the film guide means.

Manifold assembly 26, as described previously, is comprised of spaced front and rear plates 28 and 32, respectively. Preferably, the front and rear plates are formed from 0.01″–0.06″ thick phenolic plastic, the spacing therebetween ranging from ⅛″ to ½″ depending upon the overall size of the holder. The spacing means are in the form of walls extending therebetween, and are advantageously fabricated from foamed polystyrene. The walls are bonded to the front and rear plates by an epoxy cement. By utilizing all plastic components the chamber of the present invention has many important advantages over the prior art. It is light in weight and is not subject to warping resulting from environmental changes. Furthermore, a plastic sheet is more easily punched than a metal sheet. It is to be understood that other suitable plastics having equivalent properties, such as polyesters and polyurothenes, may be substituted for the phenolic and foamed polystyrene plastics, respectively.

For the film holder illustrated, three sets of nested, parallel walls 50a–d, 52a–d and 54a–d define suction chambers 56, 58 and 60, respectively (FIG. 4). Chamber 60 is contained within the boundaries of walls 54a–d and is directly below and in communication with a particular series of apertures 30 in front plate 28. For purposes of illustration, chamber 60 has inside dimensions of approximately 11″ by 14″. The apertures are formed on center lines parallel to and just within the inside surfaces of walls 54a–d as well as on diagonal center lines from corner to corner and vertical and horizontal center lines from side to side (FIG. 1). Therefore, a sheet of 11″ by 14″ photosensitive film may be loaded in a darkroom and securely held by members 34a and 34b in the position shown in FIG. 1 until such later time when a vacuum is applied which will firmly hold the sheet flat on front plate 28 for photographic exposure thereof. Similarly, a row of apertures 30 is formed parallel to and just within walls 52a–d and 50a–d to provide suction communication between front plate 28 and chambers 58 and 56.

In cooperation with film guide 34a and 34b, walls 52a–c and 54a–c are provided with a plurality of magnets 62 which are secured thereto in cutouts or notches 63 by means such as an epoxy cement. The magnets extend the full height of the walls between the inner opposed surfaces of plates 28 and 32. Assuming that an 11″ by 14″ sheet is to be exposed, then the film guides would be positioned, as shown in FIG. 1, with pins 46 of the L-shaped portion 35a and 35b of the guiding and holding means in apertures 30a. The sheet of photosensitive film would then be loaded in a darkroom by sliding it under lip portions 44 of holding means 34a and 34b. Extensions 36a and 36b are then pivoted into abutting engagement with the lower edge of the film. Pins 46 in extensions 36a and 36b would likewise be registered with apertures 30a and each film guide would be attracted by magnets 62 located directly below front film supporting plate 28 and underneath the ferromagnetic surface of the film guides. The same procedure could be followed for the next larger size of film for which the illustrated holder is adapted, namely 14 by 17 inches. The largest size sheet accommodated by the holder illustrated is 16 by 20 inches for which film guides 34a and 34b are not utilized. Instead, the thin, flexible photosensitive medium is inserted between bars 64 and front film support plate 28. Bars 64 extend inwardly from and along at least a portion of rails 14 and 16, being spaced from the front surface of plate 28 substantially the same amount as a single thickness of the film medium. The largest sheet is also held along its two shorter edges by being inserted between top cross piece 18 and front plate 28, and also within hinged bottom cross piece 22. Bars 64 then serve to hold down the central portion of the sheet and prevent it from buckling prior to the application of suction.

Of particular importance is the fact that a single pair of film guides may be used for both the two smallest sheet sizes, namely 11″ by 14″ and 14″ by 17″ in the embodiment illustrated. For the smaller sheet size, extensions 36a and 36b will form acute angles with legs 35a and 35b; while for a 14″ by 17″ sheet, extensions 36a and 36b will form obtuse angles with legs 35a and 35b. In either case, the lower edge of the sheet will be held by the magnetic attraction of the extensions to the magnets imbedded in the chamber wall beneath the front plate. The apparatus is dimensioned such that upon the application of a vacuum, the thin, flexible film will be held on its periphery by suction through the apertures proximate the inside of the chamber walls.

Suction is selectively supplied to the various chambers by means of a unique ducting system that permits the use of suction means either integral with the camera or from a remote source. As may best be seen in FIG. 4, conduit 70 passes through wall 50d of chamber 56 and terminates in an external automatic coupler 72 which is adapted to be plugged into a mating coupler (not shown) contained within the camera and which is in communication with an integral suction source. Within the holder, conduit 70, which advantageously is either square or rectangular in cross section to provide maximum suction for a given volume, is channeled through chamber 56 and terminates in valve assembly 20 located in top cross pieces 18. The cross sectional configuration of the conduit is important, particularly in the smaller size holders wherein the depth of the chamber is minimal. Therefore, maximum output must be obtained from the smaller conduit contained therein. This may be done by the use of either square or rectangular conduit as opposed to round conduit. Valve assembly 20 is threaded to provide connection means 74 to an external source of suction by means such as hosing, should there be no suction source available in the camera itself. If connection means 74 is utilized, then coupler 72 is plugged by means of a cap (not shown).

Figure 7A:
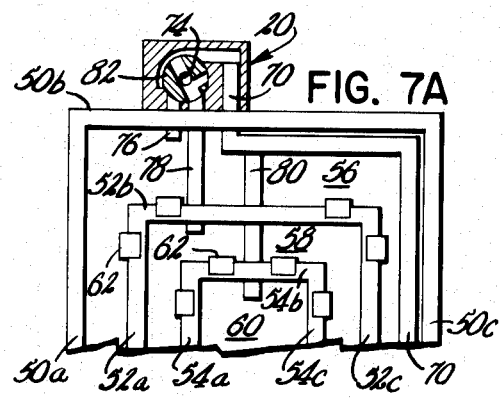
FIG. 7A and FIG. 7B are schematic illustrations of valve means used in conjunction with the present invention whereby a range of sheet sizes may be accommodated in a single film holder.
Figure 7B:
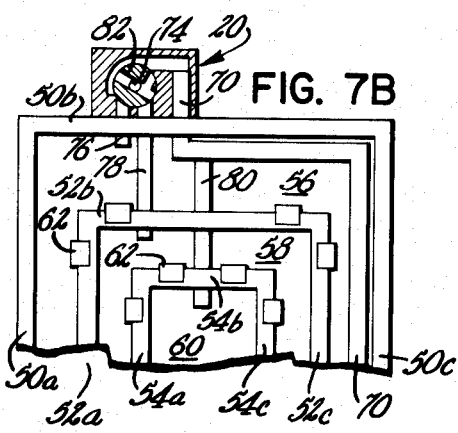

Valve 20 is further provided with three lengths of square or rectangular cross sectional tubing 76, 78, and 80. Tube 76 passes through wall 50b to terminate in chamber 56; tube 78 passes through walls 50b and 52b to terminate in chamber 58; and tube 80 in communication with conduit 70 passes through walls 52b and 54b, terminating in chamber 60. It will be noted in FIG. 4, FIG. 7A and FIG. 7B that the smallest chamber 60 is supplied directly by conduit 70 and is not valve controlled. It is constructed in this manner so that the central portion of all sheets, regardless of size, is firmly held by the suction action. FIG. 7A illustrates vacuum being applied to the intermediate chamber 58 as well as the smallest chamber 60. FIG. 7B illustrates vacuum being applied to the smallest chamber 60 only.

When selector 82 is turned to the smallest size, 11" by 14" (FIG. 7B) the remaining two chambers will be shut off and deprived of suction. Alternatively, selector 82 may be set to provide suction for the intermediate size chamber (plus the smallest size chamber which is always provided with suction) and in this case, the largest size chamber will be deprived of suction (FIG. 7A). When it is desired to use the largest sheet size that may be accommodated by the holder, then selector 82 is reset, providing suction for chambers, namely 56, 58 and 60 (FIG. 4).

Figure 3:
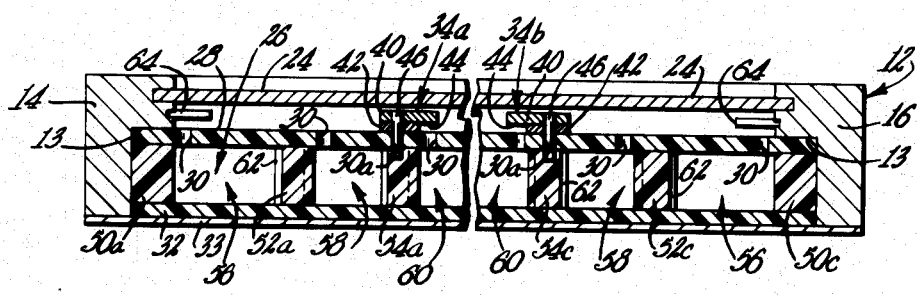
FIG. 3 is a fragmentary, enlarged cross sectional view taken through the holder of FIG. 1 along line 3—3.
Figure 8:
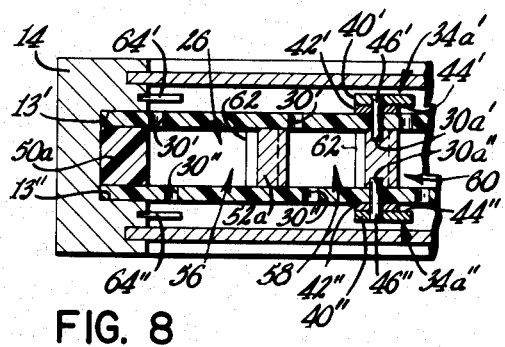
FIG. 8 is a fragmentary, enlarged cross sectional view of an alternative embodiment that serves as a double film holder.

FIG. 8 illustrates an alternative embodiment of the present invention that may be utilized as a double holder for thin sheet films of flexible photosensitive material. Essentially this embodiment is a back-to-back version of the apparatus shown in FIG. 3. Therefore, in the interest of simplicity, the same reference characters will be employed with the internal elements in the upper half carrying a single prime and the internal elements in the lower half carrying a double prime.

The construction and material of the double holder is the same as described hereinabove with regard to the single holder. However, one constructional feature should be noted. Apertures 30' and 30" are intentionally misaligned in order to prevent the fogging of one sheet when the opposite sheet is exposed to light. It has been found that this offset is all that is required to assure proper exposure control. When it is desired to use only a single sheet in the double holder, an effective vacuum chamber may be made by simply placing a piece of paper or cardboard over the unused surface.

The foregoing description sets forth several inexpensive, yet effective, detachable means for guiding and retaining several sizes of thin, flexible photosensitive film in either a single or double holder. The apparatus of the present invention also permits rapid changing from one size sheet to another, within the range of the holder, without the use of special tools. While accomplishing this, the present holder is completely portable and permits loading in a darkroom that is remote and separate from the camera site. In particular, many holders may be loaded at one time and many cameras so servcied without costly shut-down time of the cameras.

In combination with these features and advantages is a ducting and valving system that insures holding the film perfectly flat after it has been properly guided and held in the correct position until it is ready for exposure. The ducting system permits use of suction either integral with the camera or remote therefrom. Further, the valving system of the present invention, in combination with the ducting means and the guide means, provides means for securely holding several different sizes of a thin, flexible photosensitive medium.

There have been disclosed heretofore the best embodiments of the invention presently contemplated and it is to be understood that various changes and modifications may be made by those skilled in the art without departing from the spirit of the invention.

What is claimed is:

1. A portable, vacuum type holder for a thin sheet of flexible, photosensitive film having top, bottom and side edges comprising:
    (a) a frame member comprised of a pair of spaced side rails, a top piece and a hinged bottom piece;
    (b) a substantially flat front plate and a rear plate spaced therefrom to define a vacuum chamber, said chamber being secured within said frame member, said front plate being provided with a plurality of apertures therethrough, whereby said apertures substantially coincide with the edges of said sheet;
    (c) a plurality of magnetic members secured in said vacuum chamber adjacent to and behind said front plate, whereby said magnets substantially coincide with the edges of said sheet;
    (d) detachable film holding guides having a magnet attractive underside; and
    (e) coupling means in communication with said chamber, said coupling means adapted for the application of a vacuum whereby said thin, flexible sheet of photosensitive film is firmly held substantially flat against said front plate of said chamber.

2. The apparatus of claim 1 including film guide registering means arranged to superimpose said guiding means on said front plate in juxtaposition to magnetic members.

3. The apparatus of claim 1 including a plurality of pins depending from the underside of said film guiding means, said pins being adapted to register with said apertures in said front plate.

4. The apparatus of claim 1 wherein said film guide means is provided with a pivotable extension member, said extension member being adapted to abut and hold one edge of said film sheet when said guide means is operatively positioned.

5. The apparatus of claim 1 wherein said film guide means is provided with a pivotable extension member, said extension member including a pin depending from the underside of said guide means, said pin being adapted to register with one of said apertures in said front plate when said guide means is operatively positioned.

6. The apparatus of claim 1 including a slidably removable, light retarding shield adapted for insertion into said frame member, said shield arranged to overlay a single sheet of film inserted in said holder to prevent exposure thereof.

7. The apparatus of claim 1 including fixed sheet holding means comprised of a bar secured in each of said side rails and extending inwardly therefrom, said bars being spaced from the apertured front plate of said chamber by a dimension slightly greater than the thickness of a single sheet of thin, flexible photosensitive material.

8. The apparatus of claim 7 wherein said holding means is positioned at substantially the midpoint of said frame member.

9. The apparatus of claim 1 wherein said vacuum chamber is comprised of a plurality of separate, nested compartments, said compartments being defined by said front and rear plates and a continuous wall extending between said front and rear plates, said wall defining the periphery of each compartment, said chamber further including valve means adapted to selectively induce a vacuum in at least one of said compartments.

10. In combination with a camera utilizing a ground glass for focusing, a portable, vacuum type film holder comprising:
    (a) a frame member comprised of a pair of spaced side rails, a top piece and a hinged bottom piece;
    (b) a substantially flat front plate and a rear plate spaced therefrom to define a vacuum chamber, said chamber being secured within said frame member, said front plate being provided with a plurality of apertures therethrough, whereby said apertures substantially coincide with the edges of said sheet;
    (c) a plurality of magnetic members secured in said vacuum chamber adjacent to and behind said front plate, whereby said magnet substantially coincide with the edges of said sheet;
    (d) detachable film guide means having a magnet attractive underside; and
    (e) coupling means in communication with said chamber, said coupling means adapted for the application of a vacuum whereby said thin, flexible sheet of photosensitive film is firmly held substantially flat against said front plate of said chamber.

11. The apparatus of claim 10 including film guide registering means arranged to superimpose said guiding means on said front plate in juxtaposition to magnetic members.

12. The apparatus of claim 10 including a plurality of pins depending from the underside of said film guiding means, said pins being adapted to register with said apertures in said front plate.

13. The apparatus of claim 10 wherein said film guide means is provided with a pivotable extension member, said extension member being adapted to abut and hold one edge of said film sheet when said guide means is operatively positioned.

14. The apparatus of claim 10 wherein said film guide means is provided with a pivotable extension member, said extension member including a pin depending from the underside of said guide means, said pin being adapted to register with one of said apertures in front plate when said guide means is operatively positioned.

15. The apparatus of claim 10 including a slidably removable, light retarding shield adapted for insertion into said frame member, said shield arranged to overlay a single sheet of film inserted in said holder to prevent exposure thereof.

16. The apparatus of claim 10 including fixed sheet holding means comprised of a bar secured in each of said side rails and extending inwardly therefrom, said bars being spaced from the apertured front plate of said chamber by a dimension slightly greater than the thickness of a single sheet of thin, flexible photosensitive material.

17. The apparatus of claim 16 wherein said holding means is positioned at substantially the midpoint of said frame member.

18. The apparatus of claim 10 wherein said vacuum chamber is comprised of a plurality of separate nested compartments, said compartments being defined by said front and rear plates and a continuous wall extending between said front and rear surfaces, said wall defining the periphery of each compartment, said chamber further including valve means adapted to selectively induce a vacuum in at least one of said chambers.

References Cited by the Examiner
UNITED STATES PATENTS

| | | | |
|---|---|---|---|
| 2,814,233 | 11/1957 | Anander | 88—24 |
| 2,842,037 | 7/1958 | Gobeille et al. | 95—76 |

NORTON ANSHER, *Primary Examiner.*